Patented Aug. 7, 1945

2,381,024

UNITED STATES PATENT OFFICE 2,381,024

PROCESS OF PRODUCING IRON POWDER FROM CHEAP SOURCE MATERIAL

John Wulff, Cambridge, Mass.

No Drawing. Application May 29, 1942,
Serial No. 445,084

4 Claims. (Cl. 75—28)

This invention relates to a process of producing iron powder from cheap source material, more particularly to producing iron powders from cheap reject ferruginous material, such as scrap shot.

As is known, in recent years there has been a marked extension in the use of metal shot and powders for cleaning and cutting steel. These materials include relatively cheap iron shot used for cleaning or blasting purposes and more expensive products such as tungsten carbide powder used for cutting metals.

In the use of cheaper iron shot, due to the high impact stresses, the material soon fractures and powders. This powdered product, at the present time, has no substantial commercial market. A small amount is employed in the production of sparklets but the greater proportion constitutes a waste product.

The present invention comprehends the concept of utilizing such waste material as a source material for the production of fine metal powders of essentially different characteristics for which there is a commercial demand, such as for fine blasting powders, for admixture with other metal powders in the production of powder compacts and the like.

The invention is based on the novel though simple concept that by a relatively simple metallurgical treatment, such waste or reject material may be converted into a valuable commercial product.

The typical shot material which is employed for cleaning purposes is essentially a gray cast iron, i. e. an iron-carbon alloy which is relatively slowly cooled or quenched from the liquid phase such that the carbon in the liquid system tends to come out as free graphite and graphite eutectic. This material also contains a number of impurities, such as silicides and the like which while not especially disadvantageous in a cleaning shot is not desirable for other metallurgical uses.

According to the invention such waste or reject material, by suitable treatment, may be converted to a more valuable form which finds a profitable commercial use.

In one form of the invention the described waste material is processed to produce a fine cleaning shot. In carrying out the invention the waste material preferably is first cleaned of adherent oxide by any suitable method, such as by pickling in a sulphuric acid pickle. The cleaned and washed material is then carburized in any suitable furnace so as to insure the formation of iron-carbon constituents, $Fe_3C$.

After carburization to the desired degree the material is then subjected to magnetic separation in the manner described in my copending application Serial No. 338,826, filed June 4, 1940. If desired prior to such separation the material may be disintegrated and/or classified so as to produce particles of the optimum particle size. By subjecting the material to magnetic separation the more magnetic constituents, such as pearlite and the like are separated from the relatively non-magnetic constituents, such as iron carbide, graphite and the impurities, such as silicides and the like.

In this manner the impure waste material is converted to a more useful form and is freed of undesirable impurities. After such separation, if desired, the cleaned product may be heat treated so as to produce the desired metallurgical structure for the intended use.

The treated product, that is to say the screenings from the magnetic separator, serve as an excellent fine cleaning powder. This product, if desired may be mixed with reduced iron powder and utilized for the production of powder metal compacts. The improved method thus provides an economical system of producing relatively high priced products from scrap material.

While a preferred embodiment of the invention has been described it is to be understood that this is given to exemplify the underlying principles of the invention and not as limiting it to the particular one chosen for illustration.

I claim:

1. A method of producing iron powder from reject metal shot of the gray cast iron type which comprises subjecting the reject fines from said shot to a pickling operation to remove adherent oxides, washing the pickled material, carburizing the cleaned product and subjecting the carburized product to magnetic separation to recover the magnetic constituents.

2. A method of producing iron powder from reject metal shot of the gray cast iron type material which comprises subjecting reject fines from said shot to a pickling operation in a sulphuric acid solution, washing the cleaned material, carburizing the product so as to insure the formation of iron-carbon constituents and magnetically separating the relative magnetic from the relatively non-magnetic constituents.

3. A method of producing iron powder from reject metal shot of the gray cast iron type which comprises subjecting reject fines from said shot to the action of a sulphuric acid pickle to remove adherent oxides, washing the pickled material, carburizing the product, classifying the carburized product to obtain a fraction of the desired mesh and subjecting such fraction to magnetic separation to recover the magnetic constituents thereof.

4. A method of producing iron powder from reject metal shot of the gray cast iron type which comprises subjecting reject fines to a pickling operation to remove adherent oxides, washing the cleaned product, carburizing the cleaned product to insure the formation of iron carbon constituents, screen classifying the carburized product to obtain a fraction of the desired mesh and then separating the magnetic from the non-magnetic constituents of the fraction.

JOHN WULFF.